United States Patent [19]
Kawai

[11] Patent Number: 5,804,898
[45] Date of Patent: Sep. 8, 1998

[54] ELECTRIC MOTOR UTILIZING MAGNETIC ENERGY OF PERMANENT MAGNET

[75] Inventor: Teruo Kawai, Tokyo, Japan

[73] Assignee: Nihon Riken Co., Ltd., Tokyo, Japan

[21] Appl. No.: 881,270

[22] Filed: Jun. 24, 1997

Related U.S. Application Data

[63] Continuation of Ser. No. 526,920, Sep. 12, 1995, abandoned.

[51] Int. Cl.$^6$ .............................. H02K 7/06; H02K 37/00
[52] U.S. Cl. ................................ 310/82; 310/80; 310/81; 310/268; 310/49 R
[58] Field of Search .................................. 310/80, 81, 82, 310/49 R, 268

[56] References Cited

U.S. PATENT DOCUMENTS

| | | | |
|---|---|---|---|
| Re. 29,411 | 9/1977 | Newell | 310/49 R |
| 3,474,272 | 10/1969 | Newell | 310/49 R |
| 3,530,322 | 9/1970 | Newell | 310/49 R |
| 3,663,075 | 5/1972 | Kronenberg | 308/10 |
| 4,025,810 | 5/1977 | Field | 310/162 |
| 4,207,483 | 6/1980 | Baer | 310/49 R |
| 4,329,607 | 5/1982 | Rosain et al. | 310/82 |
| 4,330,725 | 5/1982 | Hintz | 310/82 |
| 4,827,164 | 5/1989 | Horber | 310/49 R |
| 4,843,268 | 6/1989 | Hovorka | 310/181 |
| 4,906,881 | 3/1990 | Knight | 310/82 |
| 5,030,866 | 7/1991 | Kawai | 310/82 |
| 5,218,251 | 6/1993 | Allwine, Jr. | 310/49 R |
| 5,309,041 | 5/1994 | Kawai | 310/82 |
| 5,396,140 | 3/1995 | Goldie et al. | 310/268 |

FOREIGN PATENT DOCUMENTS 61-116966  6/1986  Japan .

Primary Examiner—Thomas M. Dougherty
Assistant Examiner—Tran N. Nguyen
Attorney, Agent, or Firm—Wenderoth, Lind & Ponack, L.L.P.

[57] ABSTRACT

An electric motor is capable of increased output torque by utilizing both electric energy by an electromagnet and a magnetic energy by a permanent magnet. The electric motor includes a wobble rotor made of a magnetic material including at least one permanent magnet arranged annularly in a circumferential direction therein. A plurality of electromagnets are disposed annularly along with the outer periphery of the rotor. Current switching circuitry energizes the electromagnets in a predetermined sequence and timing. The wobble rotor is supported by a supporting mechanism around a center portion thereof in a pivotally movable manner and is capable of closely approaching or contacting an energized electromagnet at the outer periphery thereof and of wobbling movement with a certain incline toward the energized electromagnet according to the predetermined sequence and timing of the energizing of the electromagnets. The rotor includes a first crown gear formed along the outer periphery thereof and a second crown gear disposed along the annularly arranged electromagnets and opposed to and engaged with the first crown gear. The first crown gear has different number of teeth than the second crown gear.

8 Claims, 8 Drawing Sheets

ELECTRIC MOTOR UTILIZING MAGNETIC ENERGY OF PERMANENT MAGNET

This application is a continuation of now abandoned application, Ser. No. 08/526,920, filed Sep. 12, 1995.

BACKGROUND OF THE INVENTION

1. Field of the Invention

The present invention relates to an electric motor utilizing permanent magnets, and particularly to an electric motor utilizing convergence of magnetic flux by at least one permanent magnet and a plurality of electromagnets which are sequentially energized.

2. Description of the Related Art

As a conventional power generating apparatus utilizing conversion of electric energy to kinetic energy, various types of electric motors have been known in the art. An existing electric motor typically comprises a fixed annular electromagnet, i.e. a stator, and a rotating electromagnet supported therein, i.e. a rotor. As the rotor is rotated by a mutual attracting force between the stator and the rotor, a torque of the rotor is output as a motive power. In this type of an electric motor, the rotor is continuously attracted by the surrounding annular stator with a certain gap therebetween.

In attraction of a magnet of such a material as an iron member, the maximum attracting force may appear immediately before contact therebetween because the magnetic force is in proportion to an inverse of the square of a distance therebetween. With the conventional electric motor, however, there may exist a drawback that, as mentioned above, the attracting force between the rotor and the stator may not be sufficiently utilized as a rotor torque because the rotor is usually spaced apart from the outer stator by a certain distance.

In view of this, U.S. Pat. No. 5,309,041 to Kawai et al., entitled "Nutating step motor" discloses a step motor employing a wobble disc as a rotor. The wobble disc is made of a magnetic material and is disposed between two sets of annularly arranged electromagnets. The electromagnets in each set are disposed along a circle of substantially the same diameter and the sets of electromagnets are arranged concentrically so that each electromagnet in one set faces a corresponding electromagnet in the other set. The electromagnets in one set are energized sequentially while maintaining a phase of 180° relative to the electromagnets in the other set. According to the above disclosure, the inventors assert that a step motor with low speed and high torque is provided.

Through attempts to provide an electric motor of higher efficiency, the present inventor's attention has come to a phenomenon of convergence of magnetic flux from a permanent magnet. Assume that a first permanent magnet is attached at one end of an elongated plate of magnetic permeability. At the other extremity of the plate, a magnetic body will be attracted to contact the plate by the magnetic flux from the first permanent magnet. However, when a second permanent magnet is attached at the opposite side of the plate facing the first magnet, the magnetic body no longer is attracted to the plate at the other extremity thereof. This is because the magnetic flux from the first permanent magnet is converged to the second permanent magnet through the elongated plate and has no interaction with the magnetic body at the other extremity of the plate. The present inventor has attempted an improvement of an electric motor with this convergence phenomenon of magnetic flux by permanent magnet.

SUMMARY OF THE INVENTION

An object of the present invention is to provide an electric motor capable of increasing an output torque utilizing both an electric energy by an electromagnet and a magnetic energy by a permanent magnet.

Another object of the present invention is to provide an electric motor capable of smoother rotational movement of a rotor by cancelling a resisting force against a rotor torque.

A further object of the present invention is to provide an electric motor capable of higher accuracy of positioning, and instantaneous stopping and reverse motion of a rotor.

To accomplish these and other objects of the invention, an electric motor according to one aspect of the present invention comprises a substantially flat-shaped rotor formed by a member of magnetic material including at least one permanent magnet arranged annularly in a circumferential direction therein, a plurality of electromagnets disposed annularly along the outer periphery of the rotor, each of the electromagnets having an armature interacting with a substantially flat plane of the rotor, and means for energizing the electromagnets in a predetermined sequence and timing. The rotor is supported around a central portion thereof in a pivotally movable manner, and is capable of pivotal movement with a certain incline toward an energized electromagnet according to the predetermined sequence and timing of energizing of the electromagnets while the rotor closely approaches or contacts the energized electromagnet at the outer periphery thereof. The rotor includes a first gear member formed thereon in a circumferential direction and a second gear member disposed along the annularly arranged electromagnets opposed to and engaging with the first gear member, the first gear member and the second gear member having different numbers of teeth.

It may be preferable that the rotor comprises a substantially disc-shaped member of magnetic material and a ring-shaped permanent magnet disposed in a circumferential direction therein.

The energizing means may preferably include a switching means for controlling power supply to the electromagnets and a switching control means for regulating sequence and timing of energizing of the electromagnets by controlling the switching means.

According to another aspect of the present invention, a power generator comprises a rotor including a flat disc-shaped member of magnetic material and an annular permanent magnet disposed integrally in a circumferential direction therein, two groups of electromagnets, each group including a plurality of electromagnets disposed annularly and opposed to the permanent magnet of the rotor and arranged at respective opposite sides of the rotor. A first gear member is disposed annularly along the outer periphery of the rotor. A second gear member is formed annularly along one group of electromagnets, is engaged with the first gear member, and has a different number of teeth than the first gear member. A casing supports the rotor and the groups of electromagnets therein. Means pivotally supports one extremity of a shaft of the rotor at the casing so that the rotor is capable of being oscillated between the groups of electromagnets that are opposed to each other. A universal coupling is connected to the other extremity of the shaft of the rotor so as to output oscillation of the rotor as a rotation of the other extremity of the shaft. Means energizes the electromagnets in a predetermined sequence and timing.

Preferably, the pivotally supporting means comprises a shaft portion projecting from the casing, a globe-shaped portion formed at an end portion thereof, and a recessed portion in engagement with the globe-shaped portion.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF PREFERRED EMBODIMENTS AND BEST MODE FOR CARRYING OUT THE INVENTION

Figure 1:
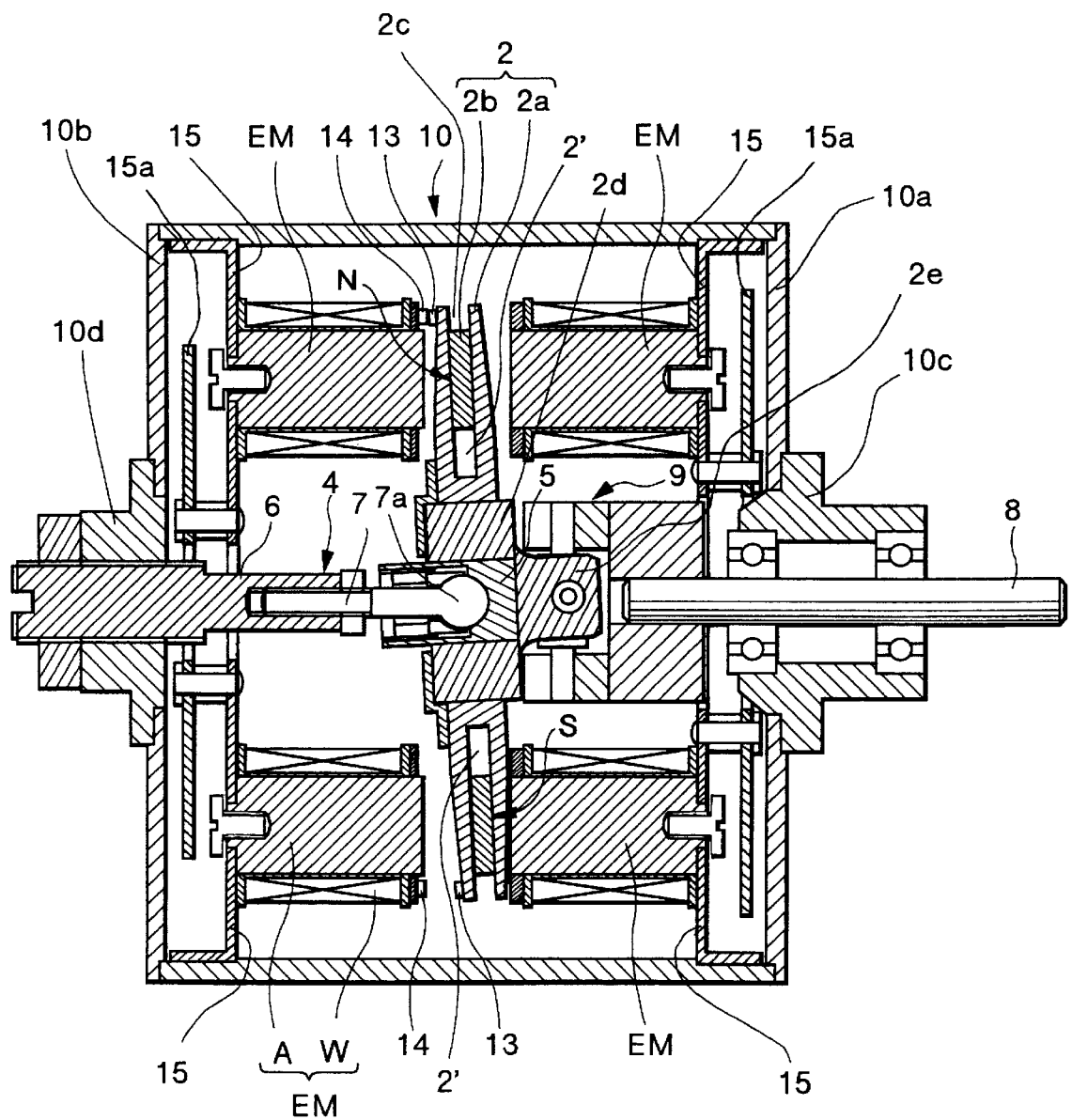
FIG. 1 is a schematic cross-sectional view of an electric motor according to one embodiment of the present invention.

Referring to FIG. 1, an electric motor of one embodiment of the present invention comprises a casing 10 with end plates 10a and 10b arranged at both ends thereof, electromagnets EM, and a wobble rotor 2 having a disc-shaped member 2a of magnetic material and a permanent magnet 2b.

Figure 2:
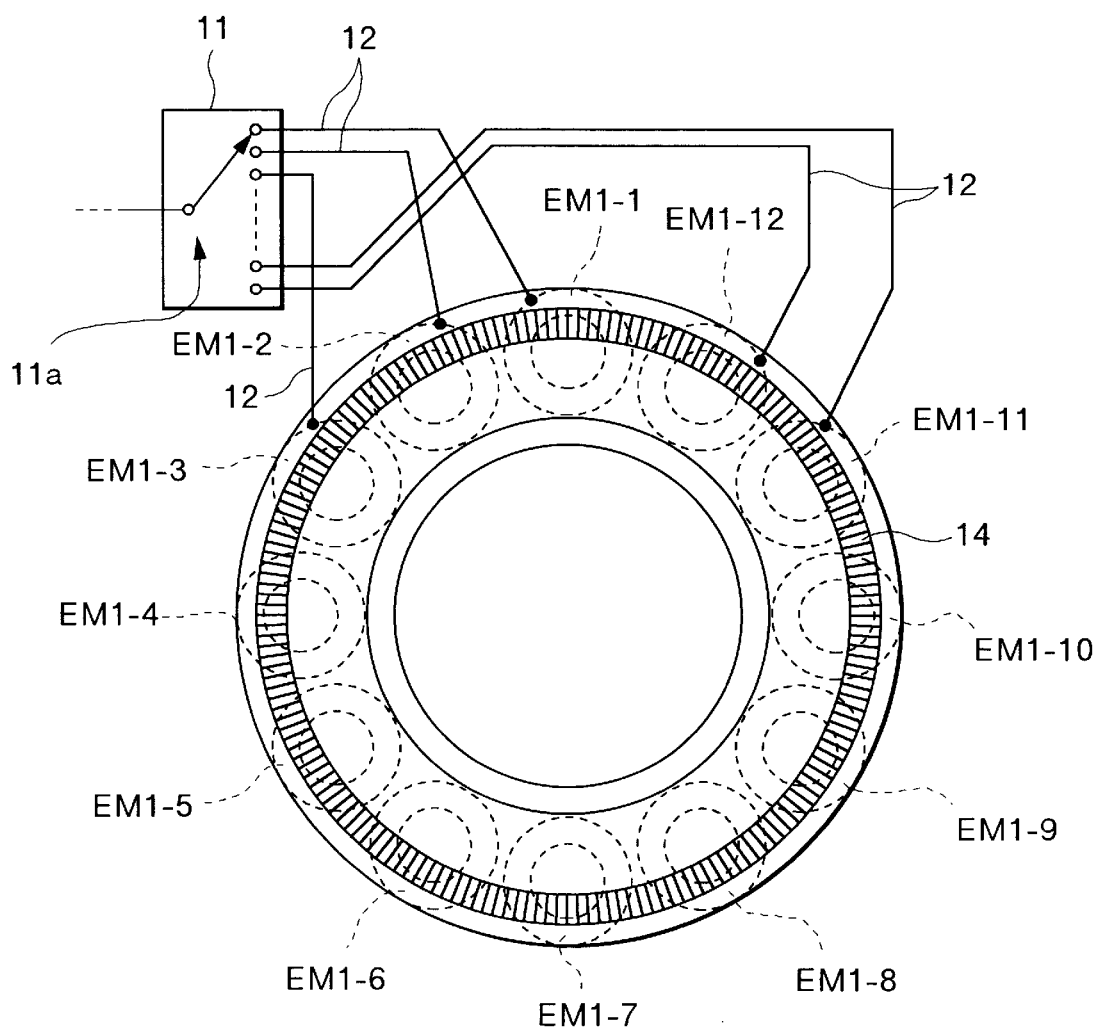
FIGS. 2 and 3 are plan views of each set of annularly disposed electromagnets.

Two groups of electromagnets $EM_1$, one group $EM_1$ at the left side and the other group $EM_2$ at the right side of the wobble rotor 2, are provided in the casing 10 by means of base frames 15 with conventional fastening means such as bolts. The base frames 15 are fixed to the inner surface of the casing 10 by a known method such as welding. As also shown in FIG. 2, each group of electromagnets includes twelve (12) electromagnets $EM_{1-2}, \ldots EM_{1-12}$ and $EM_{2-1}$, $EM_{2-2}, \ldots EM_{2-12}$, respectively, disposed annularly along a circle with a certain diameter. The groups of annularly arranged electromagnets $EM_1$ and $EM_2$ are disposed concentrically so that an electromagnet $EM_{1-n}$ in one group is in alignment with another electromagnet $EM_{2-n}$ in the other group with the wobble rotor 2 interposed therebetween. More particularly, the electromagnet $EM_{1-1}$ faces the electromagnet $EM_{2-1}$, $EM_{1-2}$ faces $EM_{2-2}$ and so forth. Each electromagnet EM comprises a magnetically permeable armature A and a winding W therearound. Apparently, the number of the electromagnets EM in each group should not be limited to the number such as twelve (12) as described above, but may be chosen from suitable numbers depending on the required characteristics of a motor. Respective terminal boards 15a are disposed between each of the end plates 10a, 10b and the corresponding base frames 15. Each terminal board 15a is a substantially ring-shaped plate made of nonconductive material, e.g., plastics. Wirings from each of the electromagnets EM are arranged on the terminal boards 15a so as to be easily withdrawn from the casing 10.

Figure 4:
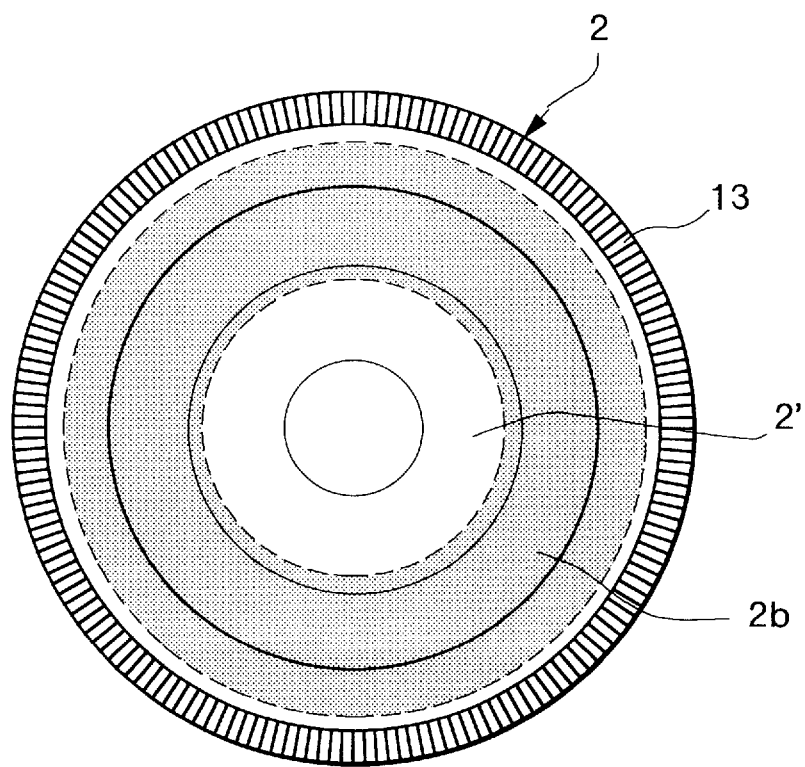
FIG. 4 is a bottom view of a wobble rotor.

The wobble rotor 2 comprises disc-shaped member 2a of magnetic material and permanent magnet 2b. The disc-shaped member 2a of magnetic material is substantially an assembly of two tapered discs integrally connected at center portions thereof. A narrow hollow portion 2c is formed between the two discs. The permanent magnet 2b is fixedly disposed in the hollow portion 2c between the two discs. The permanent magnet 2b is, as shown in FIG. 4, a substantially ring-shaped plate made of appropriate permanent magnet material. However, different arrangements may be employed. For example, a plurality of pieces made of permanent magnet material may be annularly disposed to form a circular permanent magnet arrangement. As will be apparent from the drawings, particularly FIGS. 4–8, permanent magnet 2b is a ring-shaped annular member having first and second opposite axial ends. Accordingly, a first axial end will have a first polarity and a second axial end will have a second, opposite polarity. For example, with reference to FIG. 1, the left axial end of permanent magnet 2b may be of N polarity, and the right axial end may be of S polarity. This polarity of course could be the reverse. Inwardly of the permanent magnet 2b disposed in the member 2a of magnetic material is a hollow portion 2' without the existence of magnetic material. The hollow portion 2' is provided to create a space of very low permeability so as to decrease or almost cancel a leakage loss of magnetic flux from the permanent magnet 2b. The efficiency of the motor may be significantly deteriorated if the hollow portion 2' is not provided. At the center portion of the member 2a of magnetic material of the wobble rotor 2 is fixedly provided a projecting portion 2e projecting from a hub 2d of the wobble rotor 2, to be connected to a universal joint 9 described hereinafter.

As shown in FIGS. 1, 2 and 4, a first crown gear 13 as a first gear member is provided at the outer periphery of the disc-shaped member 2a of magnetic material of the wobble rotor 2. A second crown gear 14 as a second gear member is disposed along one group of the annularly arranged electromagnets $EM_1$ and is in engagement with the first crown gear 13. The number of teeth of the first crown gear 13 is different from the number of teeth of the second crown gear 14.

A support mechanism 4 as a pivotally supporting means is disposed at the central portion of the wobble rotor 2 as shown in FIG. 1. The support mechanism 4 comprises a stem 6 tapped in an end cap 10d fixed to the end plate 10b, a support shaft 7 screwed into the stem 6 and having a round portion 7a at a tip portion thereof, and a receiving portion 5 having therein a round-shaped recess, which mates in a slidable manner with the round portion 7a. The receiving portion 5 is integral with the hub 2d of the wobble rotor 2. The wobble rotor 2 is enabled to wobble around the round portion 7a of the support shaft 7 by a coupling between the round portion 7a and the receiving portion 5.

An output shaft 8 is a shaft formed by non-ferrous material and rotatably supported by a bearing assembly 10c secured to the end plate 10a. The output shaft 8 is connected to universal joint 9. Therefore, wobbling motion of the wobble rotor 2 is converted into rotation of the output shaft 8.

Figure 3:
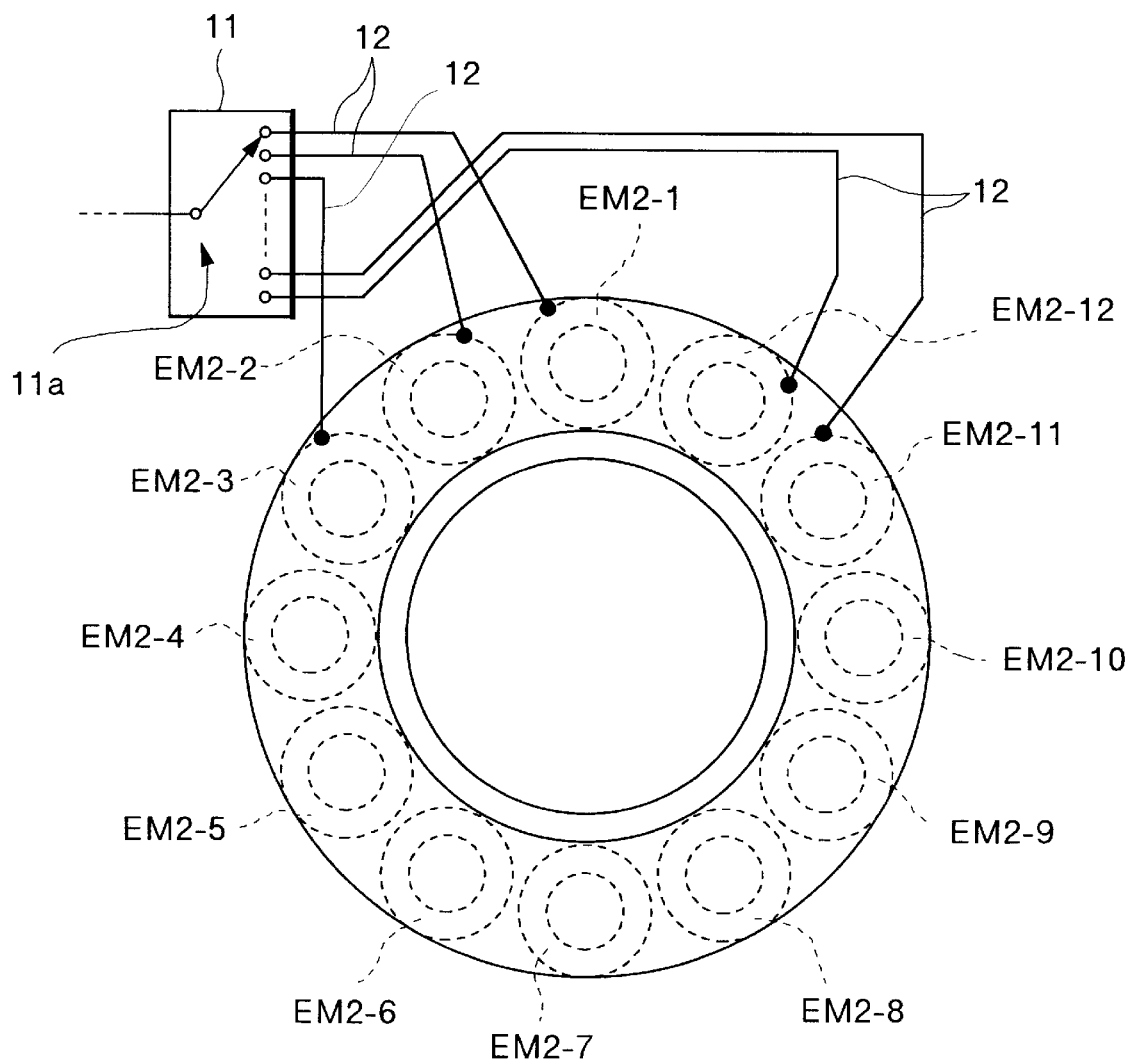

As shown in FIGS. 2 and 3, a current switching circuitry 11 comprises a plurality of switches 11a as a switching means, such as a mechanical relay and a semiconductor switch, and a controller (not shown) as a switching control means, including a microprocessor, an interface circuitry and so forth. Each of the electromagnets EM is connected to the current switching circuitry 11 by electric wirings 12. The current switching circuitry 11 feeds each of the annularly arranged electromagnets EM with electric current sequentially to energize them.

OPERATION

Referring to FIGS. 2 and 3, the electromagnets in both the group $EM_1$ and the group $EM_2$ are energized sequentially by the current switching circuitry 11 with a phase difference of 180° therebetween. What is meant here is that each of the electromagnets $EM_{1-1}$ to $EM_{1-12}$ is sequentially energized while each of the electromagnets $EM_{2-1}$ through $EM_{2-12}$ is correspondently energized. That is, when the electromagnet $EM_{1-1}$ in FIG. 2 is energized, the electromagnet $EM_{2-7}$ in FIG. 3 placed at the opposite side of $EM_{1-1}$ also is energized. The wobble rotor 2 is tilted around the support shaft 7 so that one outer peripheral portion of the rotor 2 is attracted to the electromagnet $EM_{1-1}$ to securely mate the first crown gear 13 with the second crown gear 14 whereas the opposite peripheral portion is attracted to the electromagnet $EM_{2-7}$. Then, in the sequence that $EM_{1-2}$ and $EM_{2-8}$, $EM_{1-3}$ and $EM_{2-9}$, ..., $EM_{1-12}$ and $EM_{2-6}$ are subsequently energized, the wobble rotor 2 wobbles around the support shaft 7.

In order to describe the operation of the present embodiment more illustratively, convergence of a magnetic flux $\phi$ of the permanent magnet 2b disposed in the disc-shaped member 2a of magnetic material to the group of electromagnets $EM_1$, which is one principal feature of the present invention, is shown in FIGS. 5 through 8. For ease of illustration, the other group of electromagnets $EM_2$ is omitted from such figures.

Figure 5:
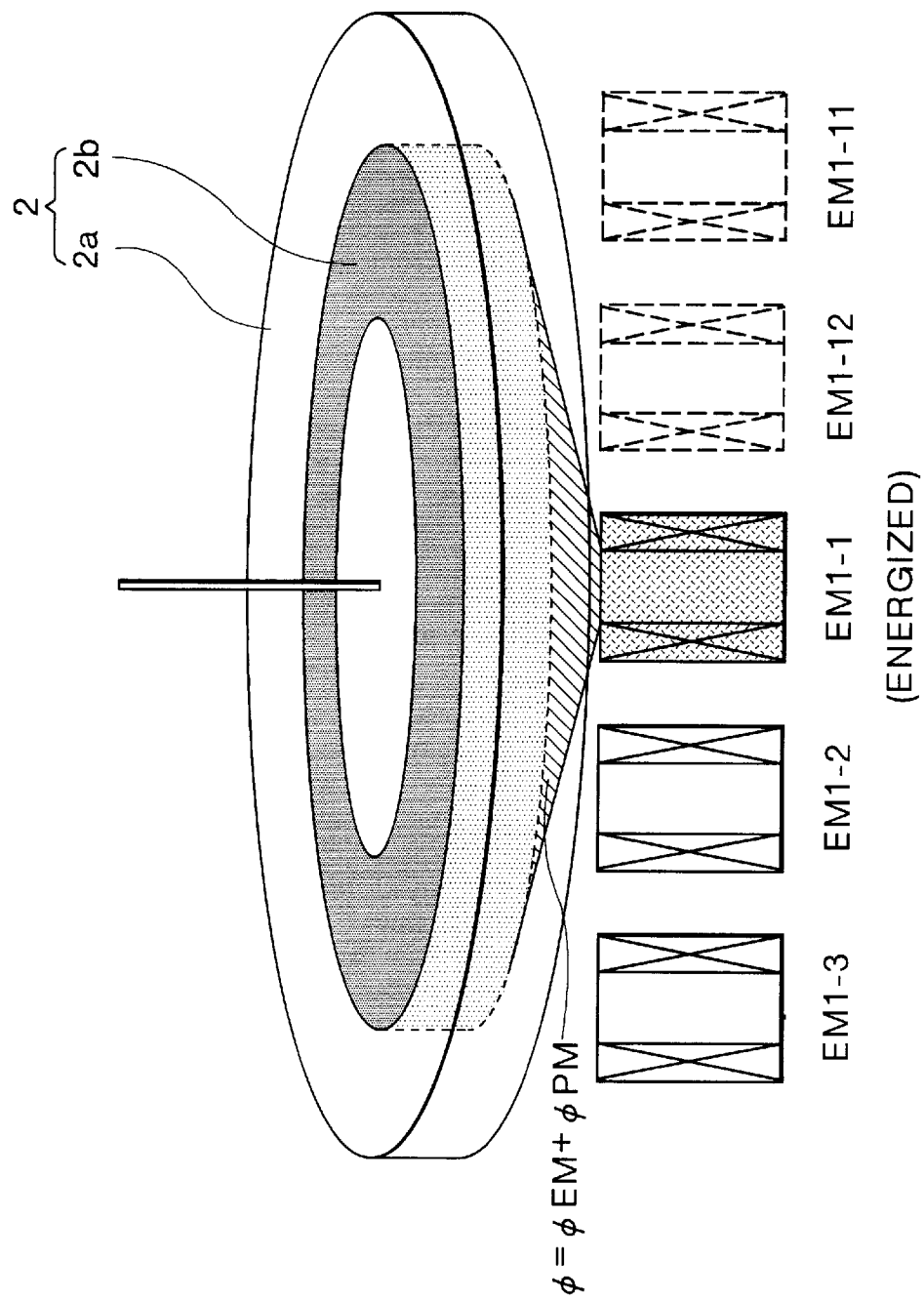
FIGS. 5 through 8 are schematic views explaining operation of one embodiment of the present invention.
Figure 6:
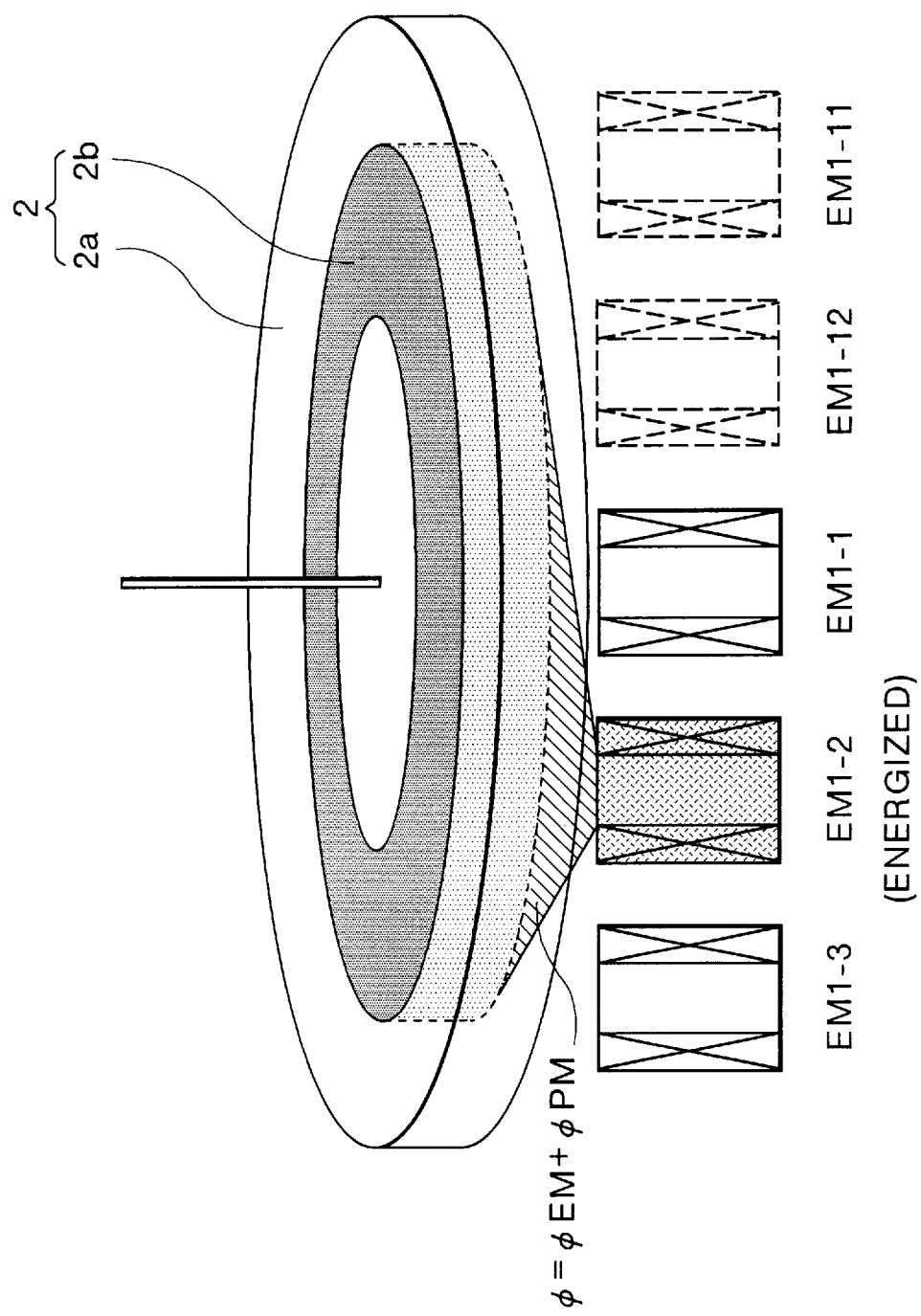
Figure 7:
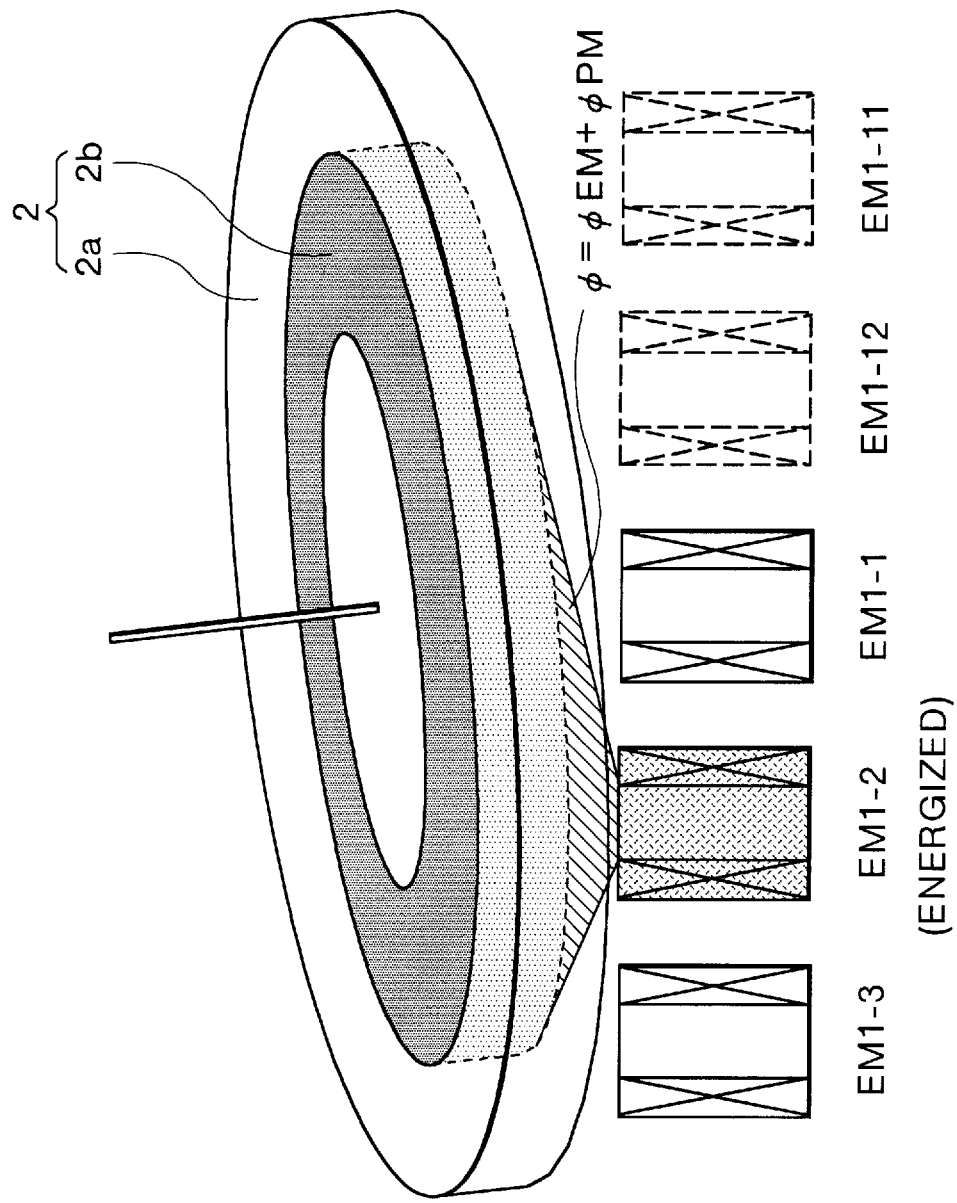

As shown in FIG. 5, when the electromagnet $EM_{1-1}$ is fed with electric current and energized, the magnetic flux $\phi_{PM}$ of the permanent magnet 2b is converged on or added to the electromagnet $EM_{1-1}$ with magnetic flux $\phi_{EM}$ of $EM_{1-1}$. The wobble rotor 2 is attracted by the electromagnet $EM_{1-1}$ and inclines in a downward direction in the figure. In this condition, the first crown gear 13 formed on the wobble rotor 2 and the second crown gear 14 disposed along the electromagnets $EM_1$ are in engagement with each other in the proximity of the electromagnet $EM_{1-1}$. Subsequently, as shown in FIG. 6, when the current to the electromagnet $EM_{1-1}$ is cut off and the electromagnet $EM_{1-2}$ is fed with the electric current and energized, the magnetic flux $\phi_{PM}$ of the permanent magnet 2b is instantaneously converged on or added to the electromagnet $EM_{1-2}$ with $\phi_{EM}$ thereof. Thereby the wobble rotor 2 is attracted toward the electromagnet $EM_{1-2}$ and the point of engagement of the first crown gear 13 of the wobble rotor 2 with the second crown gear 14 provided along the electromagnets $EM_1$ moves to the proximity of the electromagnet $EM_{1-2}$ as shown in FIG. 7.

Figure 8:
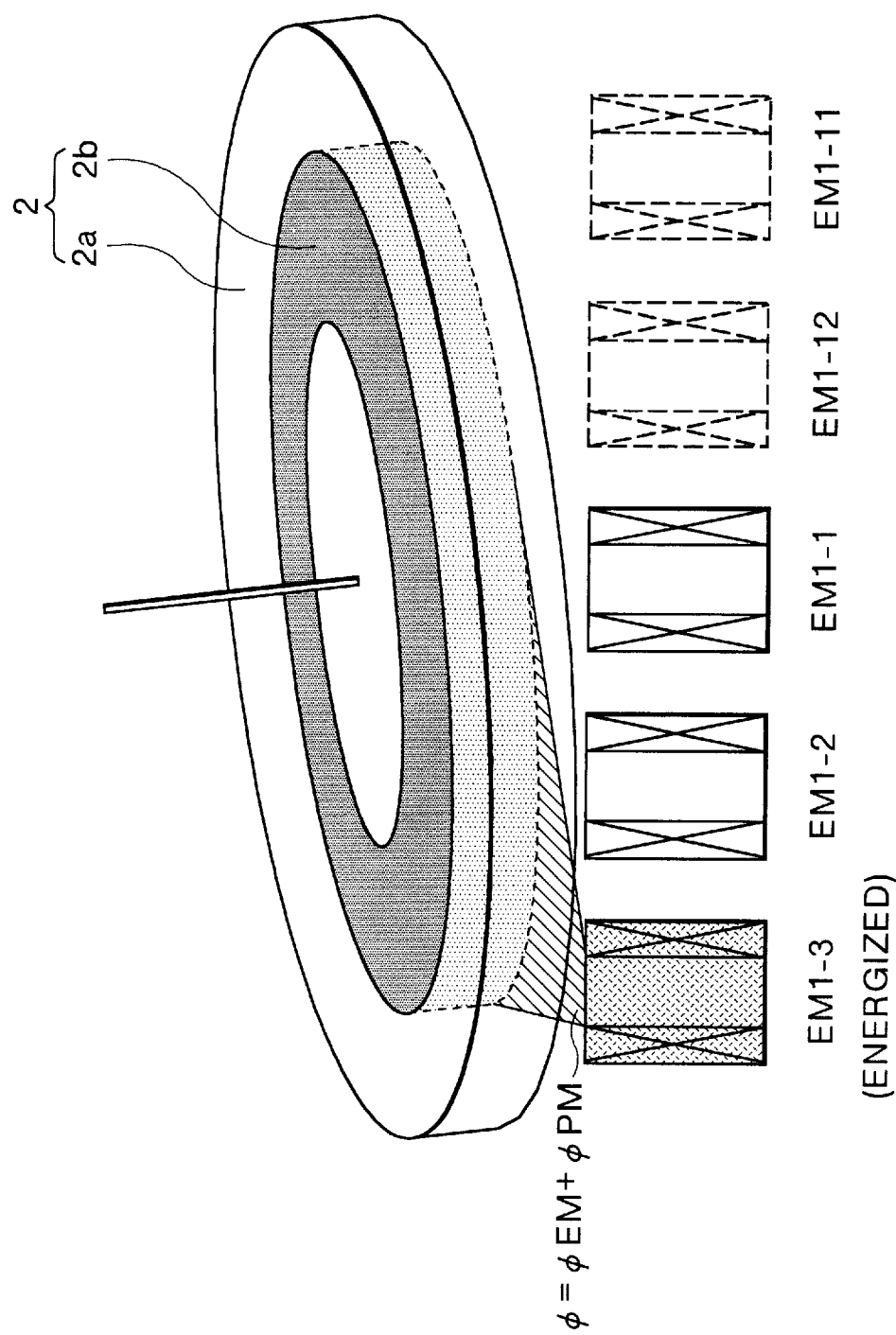

On the next stage, when the electromagnet $EM_{1-2}$ is demagnetized and the adjacent electromagnet $EM_{1-3}$ is fed with electric current and energized, as shown in FIG. 8, the magnetic flux $\phi_{PM}$ is converged on or added to the electromagnet $EM_{1-3}$ with the magnetic flux $\phi_{EM}$ thereof and the wobble rotor 2 is attracted thereto. While the subsequent electromagnets $EM_{1-4}$ through $EM_{1-12}$ are sequentially energized, the engagement point of the first crown gear 13 and the second crown gear 14 moves along the second crown gear 14. This causes the wobble rotor 2 to wobble around the support shaft 7.

A sequence of energization of the electromagnets $EM_{1-1}$ through $EM_{1-12}$ constitutes one cycle of wobbling of the wobble rotor 2 while the first crown gear 13 of the wobble rotor 2 is in engagement with the second crown gear 14 provided along the electromagnets $EM_{1-1}$ through $EM_{1-12}$. Movement of the rotor 2 is output as rotation of the output shaft 8 via the universal joint 9.

As described above, there is provided a predetermined difference in the number of teeth between those of the first crown gear 13 of the wobble rotor 2 and those of the second crown gear 14 along the electromagnets $EM_1$ side. Assuming that the first crown gear 13 has ninety-eight (98) teeth while the second crown gear 14 has a hundred (100) teeth, a rotational angle $\theta$ of the output shaft 8 during one cycle of wobbling of the wobble rotor 2 is defined as follows:

$$\theta = \{(100-98)/100\} * 360 = approx.\ 7.2°$$

In other words, one rotation of the output shaft 8 corresponds to fifty (50) cycles of energization of the set of electromagnets $EM_1$. This feature of the present invention indicates that the motor of one embodiment of the present invention is highly suitable to precise control of rotational angle and precise positioning. It should be noted that the numbers of teeth of the gears mentioned above is merely examplary and the numbers may be appropriately defined dependent on a purpose of use and so forth. Furthermore, since the first crown gear 13 of the wobble rotor 2 is permanently engaged with the second crown gear 14 on the electromagnet side, the wobble rotor 2 is capable of instantaneous stopping and reverse movement.

Moreover, in the above described embodiment, both the magnetic flux $\phi_{PM}$ of the permanent magnet 2b applied through the disc-shaped member 2a of magnetic material and the magnetic flux $\phi_{EM}$ of the electromagnet $EM_{1-1}$ to $EM_{1-12}$ and $EM_{2-1}$ to $EM_{2-12}$ are summed to produce larger torque.

In the meantime, since immediately before attractive force between the newly energized electromagnet $EM_n$ and the member 2a of magnetic material and the permanent magnet 2b is established, the previously energized electromagnet $EM_{n-1}$, on which the magnetic flux $\phi_{PM}$ of the permanent magnet 2b was converged, is deactivated, a resisting magnetic force against the wobbling movement of the wobble rotor 2 by the electromagnet $EM_{n-1}$ will not be applied to the wobble rotor 2. Thus, improvement in efficiency and smoother movement of the wobble rotor 2 is secured.

The above preferred embodiment of the present invention employs two sets of annularly arranged electromagnets $EM_1$ and $EM_2$, each disposed at respective opposite sides of the disc-shaped rotor. However, in another embodiment, a configuration including only a single set of annularly arranged electromagnets may apparently be employed.

While the present invention has been discussed in terms of preferred embodiments, the present invention may be implemented in various fashions while incorporating modifications of the disclosed embodiments. In addition, omission or modification of the detailed construction may be made without departing from the principle of the invention. Therefore, the present invention should be understood to include all embodiments encompassed within the spirit of the invention set out in the appended claims.

What is claimed is:

1. An electric motor utilizing magnetic energy of a permanent magnet, said electric motor comprising:

a rotor including a substantially disc-shaped member formed of magnetic material and a substantially flat ring-shaped annular permanent magnet disposed integrally in a circumferential direction therein, said annular permanent magnet having a first axial end of a first polarity and a second axial end of a second polarity opposite to said first polarity;

two groups of electromagnets, each said group including a plurality of electromagnets disposed annularly and opposed to a respective said axial end of said permanent magnet of said rotor and arranged at a respective axial side of said rotor;

a first gear member disposed annularly along said rotor adjacent an outer periphery thereof;

a second gear member formed annularly along one of said groups of electromagnets and engaged with said first gear member and having a different number of teeth than said first gear member;

a casing containing said rotor and said groups of electromagnets therein;

means for pivotally supporting a first end of a central portion of said rotor relative to said casing so that said rotor is capable of wobbling movement between said groups of electromagnets that oppose each other, said pivotally supporting means comprising a shaft portion projecting from an inner surface of said casing, a globe-shaped portion formed at a tip of said shaft portion, and a recessed portion formed in said central portion of said rotor, said recessed portion being in engagement with said globe-shaped portion;

a universal coupling connected to a second end of said central portion of said rotor and to convert wobbling movement of said rotor into rotation;

an output shaft connected to said universal coupling and to output said converted rotation thereof; and means for energizing said electromagnets in a predetermined sequence and timing, wherein:

a flux of said permanent magnet flows substantially in the entire said disc-shaped member when none of said electromagnets is energized, and when any one of said electromagnets of either of said groups is energized, the flux flow from said permanent magnet to the energized electromagnet is converged to flow through a restricted small area in said disc-shaped member of said rotor directly between said permanent magnet and said energized electromagnet so as to produce an attractive magnetic force therebetween, said attractive magnetic force substantially not having any interaction in the area of said disc-shaped member of said rotor other than said restricted small area.

2. An electric motor as set forth in claim 1, wherein said energized electromagnet is demagnetized when another said electromagnet adjacent to said energized electromagnet is energized by said energizing means, whereby a resisting magnetic force against the movement of said rotor by the thus demagnetized electromagnet is not applied thereto.

3. An electric motor as set forth in claim 1, wherein each of said electromagnets further comprises an armature made of magnetically permeable material, and a winding arranged therearound.

4. An electric motor as set forth in claim 1, wherein said output shaft is made of non-ferrous material.

5. An electric motor as set forth in claim 1, wherein said energizing means comprises a current switching circuitry.

6. An electric motor utilizing magnetic energy of a permanent magnet, said electric motor comprising:

a rotor including a substantially disc-shaped member formed of magnetic material and a substantially flat ring-shaped annular permanent magnet disposed integrally in a circumferential direction therein, said annular permanent magnet having a first axial end of a first polarity and a second axial end of a second polarity opposite to said first polarity;

two groups of electromagnets, each said group including plurality of electromagnets disposed annularly and opposed to a respective said axial end of said permanent magnet of said rotor and arranged at a respective axial side of said rotor, each of said electromagnets having an armature of a magnetically permeable material and a winding therearound;

a first gear member disposed annularly along said rotor adjacent an outer periphery thereof;

a second gear member formed annularly along one of said groups of electromagnets and engaged with said first gear member and having a different number of teeth than said first gear member;

a casing containing said rotor and said groups of electromagnets therein;

means for pivotally supporting a first end of a central portion of said rotor relative to said casing so that said rotor is capable of wobbling movement between said groups of electromagnets that oppose each other, said pivotally supporting means comprising a shaft portion projecting from an inner surface of said casing, a globe-shaped portion formed at a tip of said shaft portion, and a recessed portion formed in said central portion, said recessed portion being in engagement with said globe-shaped portion;

a universal coupling connected to a second end of said central portion of said rotor and to convert wobbling movement of said rotor into rotation;

an output shaft connected to said universal coupling and to output said converted rotation thereof, said output shaft being made of non-ferrous material; and current switching circuitry connected to said electromagnets, wherein:

a flux of said permanent magnet flows substantially in the entire said disc-shaped member when none of said electromagnets is energized, and when any one of said electromagnets of either of said groups is energized, the flux flow from said permanent magnet to the energized electromagnet is converged to flow through a restricted small area in said disc-shaped member of said rotor directly between said permanent magnet and said energized electromagnet so as to produce an attractive magnetic force therebetween, said attractive magnetic force substantially not having any interaction in the area of said disc-shaped member of said rotor other than said restricted small area.

7. An electric motor as set forth in claim 6, wherein said energized electromagnetic is demagnetized when another said electromagnet adjacent to said energized electromagnet is energized by said energizing means, whereby a resisting magnetic force against the movement of said rotor by the thus demagnetized electromagnet is not applied thereto.

8. An electric motor utilizing magnetic energy of a permanent magnet, said electric motor comprising:

a rotor including a substantially disc-shaped member formed of magnetic material and a substantially flat ring-shaped annular permanent magnet disposed integrally in a circumferential direction therein, said annular permanent magnet having a first axial end of a first polarity and a second axial end of a second polarity opposite to said first polarity;

two groups of electromagnets, each said group including a plurality of electromagnets disposed annularly and opposed to a respective said axial end of said permanent magnet of said rotor and arranged at a respective axial side of said rotor;

a first gear member disposed annularly along said rotor adjacent an outer periphery thereof;

a second gear member formed annularly along one of said groups of electromagnets and engaged with said first gear member and having a different number of teeth than said first gear member;

a casing containing said rotor and said groups of electromagnets therein;

a ball joint means for connecting a first end of a central portion of said rotor with said casing so that said rotor is capable of wobbling movement between said groups of electromagnets that oppose each other;

a universal coupling connected to a second end of said central portion of said rotor and to convert wobbling movement of said rotor into rotation;

an output shaft connected to said universal coupling and to output said converted rotation thereof; and means for energizing said electromagnets in a predetermined sequence and timing, wherein:

a flux of said permanent magnet flows substantially in the entire said disc-shaped member when none of said electromagnets is energized, and when any one of said electromagnets of either of said groups is energized, the flux flow from said permanent magnet to the energized electromagnet is converged to flow through a restricted small area in said disc-shaped member of said rotor directly between said permanent magnet and said energized electromagnet so as to produce an attractive magnetic force therebetween, said attractive magnetic force substantially not having any interaction in the area of said disc-shaped member of said rotor other than said restricted small area.

* * * * *